(12) United States Patent
Xu

(10) Patent No.: US 10,945,101 B2
(45) Date of Patent: Mar. 9, 2021

(54) METHOD, DEVICE AND SYSTEM FOR AUDIO DATA COMMUNICATION

(71) Applicant: ZGMICRO NANJING LTD, Jiangsu (CN)

(72) Inventor: Bin Xu, Jiangsu (CN)

(73) Assignee: Zgmicro Nanjing Ltd., Jiangsu (CN)

( * ) Notice: Subject to any disclaimer, the term of this patent is extended or adjusted under 35 U.S.C. 154(b) by 15 days.

(21) Appl. No.: 16/659,583

(22) Filed: Oct. 22, 2019

(65) Prior Publication Data
US 2020/0162852 A1    May 21, 2020

(51) Int. Cl.
| | |
|---|---|
| H04W 4/06 | (2009.01) |
| G10L 19/16 | (2013.01) |
| H04W 4/80 | (2018.01) |
| G11B 27/10 | (2006.01) |
| H04L 1/00 | (2006.01) |
| H04W 28/18 | (2009.01) |
| H04L 1/08 | (2006.01) |

(52) U.S. Cl.
CPC ............ *H04W 4/06* (2013.01); *G10L 19/167* (2013.01); *G11B 27/10* (2013.01); *H04L 1/0061* (2013.01); *H04L 1/08* (2013.01); *H04W 4/80* (2018.02); *H04W 28/18* (2013.01)

(58) Field of Classification Search
CPC ......... H04W 4/06; H04W 4/80; H04W 28/18; G10L 19/167; G11B 27/10; H04L 1/0061; H04L 1/08; H04L 1/0026; H04L 1/0041; H04L 1/0045; H04L 1/18; H04L 2001/0093; H04B 1/7183; H04R 2227/005; H04R 2420/07; H04R 3/12

See application file for complete search history.

(56) References Cited

U.S. PATENT DOCUMENTS

| | | | | |
|---|---|---|---|---|
| 10,020,023 | B2* | 7/2018 | Zeng | H04N 21/26258 |
| 10,681,463 | B1* | 6/2020 | Beckhardt | H04S 3/008 |
| 2003/0018662 | A1* | 1/2003 | Li | H04N 21/439 |
| | | | | 715/203 |
| 2010/0142927 | A1* | 6/2010 | Lim | H04N 21/2368 |
| | | | | 386/239 |
| 2012/0087503 | A1* | 4/2012 | Watson | H04S 3/008 |
| | | | | 381/23 |
| 2014/0010515 | A1* | 1/2014 | Lee | H04L 65/605 |
| | | | | 386/207 |

(Continued)

*Primary Examiner* — Devan A Sandiford
(74) *Attorney, Agent, or Firm* — Joe Zheng

(57) ABSTRACT

A method, a device and a system for audio data communication are provided in the present invention. The method comprises: encoding audio data at a fixed interval to obtain a plurality of frames of encoded audio data; broadcasting M frames of the encoded audio data on a broadcast anchor time slot of a first time slot at a predetermined broadcast interval; and playing the audio data after delaying a predetermined time from an anchor of the first broadcast anchor slot. The predetermined time is configured for synchronous playback of the audio data at a local end and one or more opposite ends, the predetermined broadcast interval is M times of the fixed interval, M is a positive integer, the predetermined time is X times of the broadcast interval, and the X is a positive integer. Thereby, synchronous playback of audio data from one point to multiple points can be realized.

29 Claims, 7 Drawing Sheets

(56) References Cited

U.S. PATENT DOCUMENTS

| | | | |
|---|---|---|---|
| 2014/0029701 A1* | 1/2014 | Newham | H04J 3/0652 |
| | | | 375/340 |
| 2017/0231027 A1* | 8/2017 | Sonnleitner | H04W 76/15 |
| 2018/0012632 A1* | 1/2018 | Moller | H04N 21/43615 |
| 2018/0167149 A1* | 6/2018 | Stilwell | H04L 65/60 |
| 2019/0045304 A1* | 2/2019 | Bhalla | H04R 3/00 |
| 2020/0213377 A1* | 7/2020 | Xu | H04L 1/0045 |

* cited by examiner

METHOD, DEVICE AND SYSTEM FOR AUDIO DATA COMMUNICATION

BACKGROUND OF THE INVENTION

Field of the Invention

The present invention is related to the area of communication technologies, and more particularly relates to a method, a device and a system for audio data communication for synchronous playback of an audio from one point to multiple points.

Description of the Related Art

Extensive development of a Bluetooth technology enables Bluetooth products to become part of daily life. Audio applications, such as a Bluetooth headset and a Bluetooth speaker centered on smart phones, bring great convenience to users in their lives.

Bluetooth is primarily a point-to-point communication primarily. Such a network topology limits Bluetooth to meet a wider range of needs. To this end, connectionless slave broadcast (CSB) protocol is added into the Bluetooth standard to achieve point-to-multipoint data transmission. However, the inventor herein found that the CSB protocol cannot achieve synchronous playback of audio from one point to multiple points.

In the prior art, an audio and video synchronization technology generally adopts a timestamp method. That is, a playing time is added to each frame of audio and video data, thereby achieving synchronous playing. However, if this method is directly used for synchronous playback of audio from one point to multiple points under the CSB protocol, bandwidth consumption would increase. It may be seen that there are currently no perfect technical solutions to solve the problem of synchronous playback of audio from one point to multiple points.

SUMMARY OF THE INVENTION

This section is for the purpose of summarizing some aspects of the present invention and to briefly introduce some preferred embodiments. Simplifications or omissions in this section as well as in the abstract and the title may be made to avoid obscuring the purpose of this section, the abstract and the title. Such simplifications or omissions are not intended to limit the scope of the present invention.

The present invention is generally related to architecture and designs of Bluetooth-related products and technologies, specifically for synchronous playback of audio from one point to multiple points. According to one aspect of the present invention, audio data is encoded at a fixed interval to obtain a plurality of frames of encoded audio data. M frames of the encoded audio data are broadcast on a broadcast anchor time slot in a first time slot at a predetermined broadcast interval. Upon receiving the M frames of the encoded audio data, the M frames are played back after being delayed for a predetermined time from an anchor of a first broadcast anchor slot. The predetermined time is configured for synchronous playback of the audio data at one local end and one or more opposite ends, the predetermined broadcast interval is M times of the fixed interval, M is a positive integer, the predetermined time is X times of the broadcast interval, and the X is a positive integer.

According to another aspect of embodiments of the present invention, there is provided an audio data communication method comprising: receiving and demodulating audio data on a broadcast anchor slot of a first time slot at a predetermined broadcast interval; decoding the audio data; and playing back the decoded audio data starting from the audio data received on a first broadcast anchor slot after delaying a predetermined time from an anchor of the first broadcast anchor slot. The predetermined time is X times of the broadcast interval, X is a positive integer, and the predetermined time is a delayed play time of the audio data at one or more opposite ends.

According to still another aspect of the embodiments of the present invention, there is provided an audio communication device, comprising: a data and protocol processor configured to encode audio data at a fixed interval to obtain a plurality of frames of encoded audio data; a radio frequency transceiver configured to broadcast M frames of the audio data on a broadcast anchor time slot of a first time slot at a predetermined broadcast interval; and a speaker configured to play back the audio data after delaying a predetermined time from an anchor of a first broadcast anchor slot. The predetermined time is configured for synchronous playback of the audio data at one or more opposite ends, the predetermined broadcast interval is M times of the fixed interval, M is a positive integer, the predetermined time is X times of the broadcast interval, and the X is a positive integer.

According to still another aspect of embodiments of the present invention, there is provided an audio communication device comprising: a radio frequency receiver configured for receiving and demodulating audio data on a broadcast anchor slot of a first time slot at a predetermined broadcast interval; a data and protocol processor configured for decoding the audio data; a speaker configured for playing the decoded audio data starting from the audio data received on a first broadcast anchor slot after delaying a predetermined time from an anchor of the first broadcast anchor slot; wherein the predetermined time is X times of the broadcast interval, X is a positive integer, and the predetermined time is a delayed play time of the audio data at one or more opposite ends.

According to yet another aspect of the embodiments of the present invention, there is provided an audio communication system, comprising: a transceiver which is an audio communication device according to the third aspect of the present invention; one or more receiving devices which is an audio communication device according to the fourth aspect of the present invention.

In the present invention, the method at a broadcast transmitting end is configured for encoding audio data at a fixed interval to obtain a plurality of frames of encoded audio data; broadcasting M frames of the encoded audio data on a broadcast anchor time slot of a first time slot at a predetermined broadcast interval; and playing the audio data after delaying a predetermined time from an anchor of a first broadcast anchor slot. The method at a broadcast receiving end is configured for playing the decoded audio data starting from the audio data received on a first broadcast anchor slot after delaying a predetermined time from an anchor of the first broadcast anchor slot. Thereby, synchronous playback of audio from one point to multiple points is achieved without loading timestamps into each audio frame.

There are many other objects, together with the foregoing attained in the exercise of the invention in the following description and resulting in the embodiment illustrated in the accompanying drawings.

BRIEF DESCRIPTION OF THE DRAWINGS

These and other features, aspects, and advantages of the present invention will become better understood with regard to the following description, appended claims, and accompanying drawings where:

DETAILED DESCRIPTION OF THE PREFERRED EMBODIMENTS

The detailed description of the invention is presented largely in terms of procedures, operations, logic blocks, processing, and other symbolic representations that directly or indirectly resemble the operations of data processing devices coupled to networks. These process descriptions and representations are typically used by those skilled in the art to most effectively convey the substance of their work to others skilled in the art.

Reference herein to "one embodiment" or "an embodiment" means that a particular feature, structure, or characteristic described in connection with the embodiment can be comprised in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

Figure 1:
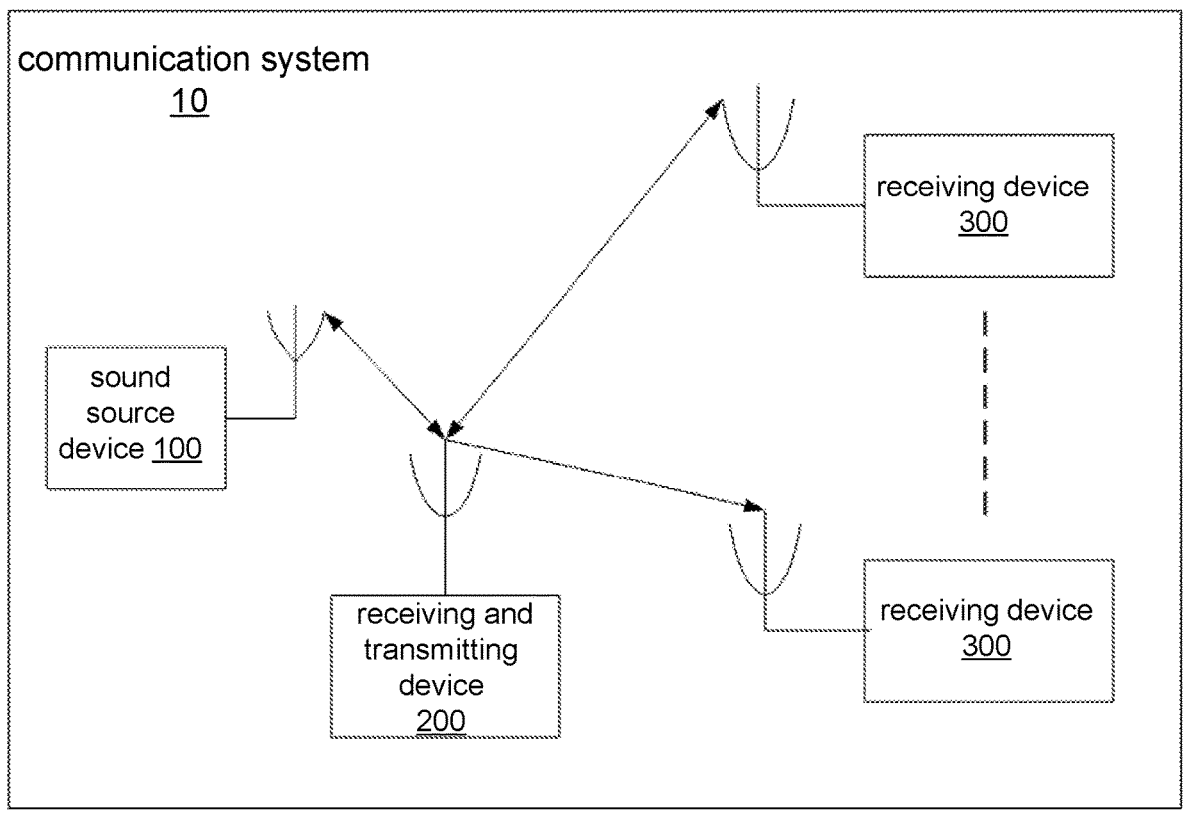
FIG. 1 shows an exemplary system in which one embodiment of the present invention may be practiced therein.

FIG. 1 shows an exemplary system in which one embodiment of the present invention may be implemented therein. As shown in FIG. 1, an exemplary communication system 10 comprises an audio source device 100, a transceiver or transceiver 200 and one or more receiving devices 300. In one embodiment, the audio source device 100 and the transceiver 200 can communicate over various wireless communication protocols, such as a Bluetooth protocol or a WiFi protocol. Specifically, the audio source device 100 and the transceiver 200 can establish an A2DP link according to the Bluetooth protocol. The audio source device 100 can send audio data in an SBC (sub band code) format to the A2DP device 200. The transceiver 200 forwards the audio data to the transceiver 300 through a broadcast protocol while the transceiver 200 plays the audio data locally.

In one embodiment, the audio source device 100 and the transceiver 200 may also communicate over various wired communication methods, such as the Internet, a wired local area network, or a USB interface protocol, etc. The transceiver 200 may also broadcast audio data stored locally or recorded by itself to the receiving devices 300 for simultaneous playing. It should be noted that specific manner and solution of the transceiver 200 to acquire audio data may be changed according to a specific implementation scenario and will not be further described. In some cases, the transceiver 200 may not communicate with the audio source device 100, and may not need to decode or demodulate the audio data. These specific implementation scenarios are all within the scope of the present invention.

In one embodiment, the audio source device 100 may be a smart phone or a smart TV. The transceiver 200 may be one of a plurality of devices having an audio playing function, such as a smart phone, a headphone, or a speaker. The receiving device 300 may also be one of a plurality of devices having an audio playing function, such as a smart phone, a headphone, or a speaker. The transceiver 200 and the receiving device 300 may be different devices that only perform respective functions respectively. In one embodiment, the transceiver 200 may only have functions of receiving and demodulating audio data from the audio source device 100, decoding the audio data, and re-encoding the decoded audio data at a fixed interval, broadcasting the re-encoded audio data on a broadcast anchor time slot of a first time slot at a predetermined broadcast interval, playing the audio data after delaying a predetermined time from an anchor of a first broadcast anchor slot. The predetermined time is configured for synchronous playback of the audio data at one local end and one or more opposite ends. The predetermined broadcast interval is M times of the fixed interval, the predetermined time is X times of the broadcast interval, where M is a positive integer, and the X is a positive integer. The receiving device 300 may only have a function of receiving audio data from the transceiver 200, and decoding and playing back the audio data in synchronization with the transceiver 200.

In another embodiment, the transceiver 200 and the receiving device 300 may also be devices that have both of the above functions. Specifically, the transceiver 200 and the receiving device 300 both have the function of receiving and demodulating audio data from the audio source device, decoding the audio data, and re-encoding the decoded audio data at a fixed interval, broadcasting the re-encoded audio data on a broadcast anchor time slot of a first time slot at a predetermined broadcast interval, playing the audio data after delaying a predetermined time from an anchor of a first broadcast anchor slot, receiving audio data from the transceiver 200, and decoding and playing back the audio data in synchronization with the transceiver 200. It should be understood that the words "transmit" or "transmitting" and "receive" or "receiving" are relative terms in the present invention, and roles of the transceiver 200 and the receiving device 300 may be interchanged in different scenarios. For example, in a certain scenario, device A is used as the transceiver 200, and device B is used as the receiving device 300. In another scenario, device B is used as the transceiver 200, and device A is used as the receiving device. It should be understood that when one of two earphones is regarded as a "transceiver" 200, the other one of the two earphones shall be regarded as a "receiving device" 300 correspondingly.

When the transceiver 200 and the receiving device 300 are devices having the above functions at the same time, one device may be used as the transceiver 200 and the other may be used as the receiving device 300. For example, the device that accesses the audio source device firstly may be used as the transceiver 200, and then the other device that accesses the audio source device secondly may be used as the receiving device 300. For another example, the device that is close to the audio source device 100 may be used as the transceiver 200, and the device that is far from the audio source device 100 may be used as the receiving device 300. For still another embodiment, the user may set the transceiver 200 or the receiving device 300 on the audio source device 100.

Different application modes may be set for the transceivers 200 and the receiving devices 300 according to different application scenarios. Different system parameters may be configured for each application mode and are broadcasted to the receiving device 300 through a synchronization sequence. The application modes comprise an outdoor high performance mode, an outdoor low delay mode, an indoor high performance mode and an indoor low delay mode. The main difference between the indoor mode and the outdoor mode is that transmission distances are different, interferences are different, fading levels are different, and volumes may be different. One of the differences between the high-performance mode and the low-latency mode is that the requirements for audio performance and delay are different. In general, a scene with high audio performance requirements may sacrifice a delay requirement.

Figure 2:
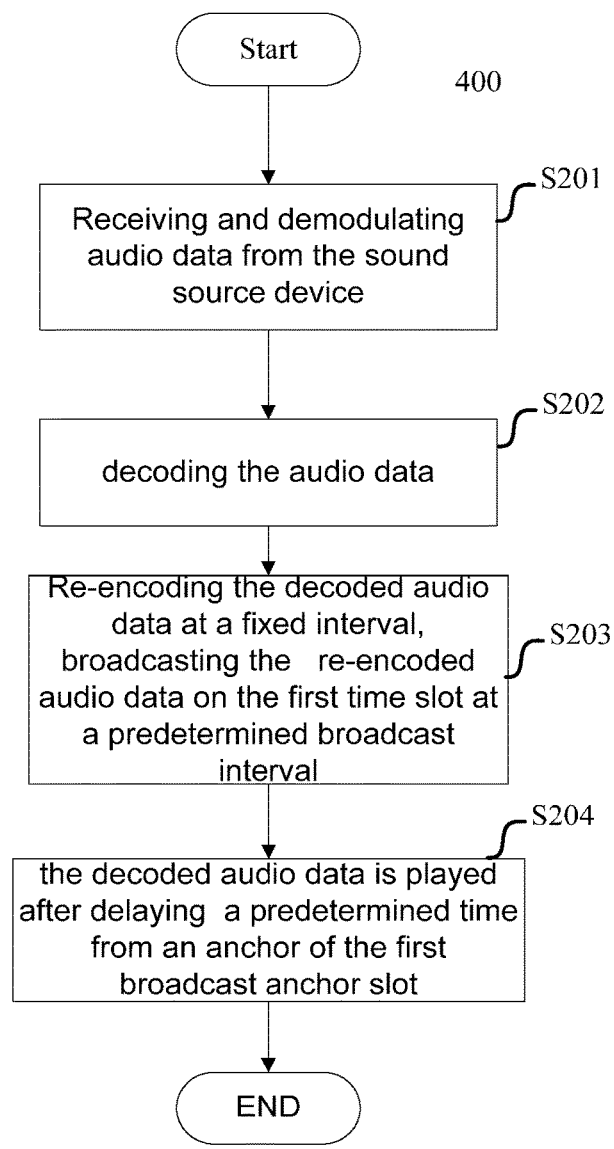
FIG. 2 is a flowchart showing a method for communicating audio data performed by a transceiver according to one embodiment of the present invention.

FIG. 2 is a flowchart showing a method 400 for audio data communication performed by a transceiver 200 according to one embodiment of the present invention. FIG. 2 may be better understood in conjunction with FIG. 1. As shown in FIG. 2, the audio data communication method 400 comprises the following operations. At S201, audio data from an audio source (e.g., the source device 100) is received and demodulated. At S202, the audio data is decoded. The implementations of S201 and S202 are well known in the art and will not be further described in detail herein.

At S203, the audio data is re-encoded at a fixed interval to obtain a plurality of frames of re-encoded audio data. M frames of the re-encoded audio data are broadcasted on a broadcast anchor time slot of a first time slot at a predetermined broadcast interval. The predetermined broadcast interval is M times the fixed interval, and M is a positive integer. It should be noted that "re-encode" can also be referred as "encode" sometimes for simplicity.

In one embodiment, the fixed interval is a length of one frame of re-encoded audio data, and the number of frames of the re-encoded audio data transmitted in one broadcast interval is equal to a ratio of the broadcast interval to the fixed interval. Thus, a length of the re-encoded audio data transmitted in one broadcast interval is exactly equal to a length of one broadcast interval. In other words, a playing time of the re-encoded audio data transmitted in one broadcast interval is exactly equal to the length of one broadcast interval. For example, it is assumed that the length of one frame of the re-encoded audio data is 10 ms, and M=2, which means that the fixed interval is 10 ms and the broadcast interval is 20 ms. If there are two frames of the re-encoded audio data transmitted in one broadcast interval, two frames of the re-encoded audio data are combined into one packet of load data. At this time, the playing time of the re-encoded audio data transmitted in one broadcast interval after decoding is 20 ms, which is exactly equal to the length of one broadcast interval. In one embodiment, a receiving function and a transmitting function (transceiving) of the transceiver 200 can share an antenna, a radio frequency transceiver, and a baseband processor by Time-Division Multiplexing (TDM).

Figure 3:
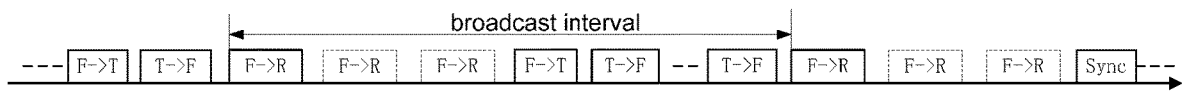
FIG. 3 is a diagram showing a communication time slot allocation according to FIG. 2.

FIG. 3 shows a communication time slot allocation diagram according to one embodiment of the present invention. As shown in FIG. 3, the length of the broadcast interval is fixed. A time slot resource in one broadcast interval is divided into two parts. One part is called as a first time slot being configured for broadcasting and transmitting the re-encoded audio data, which may also be called a "broadcast time slot". The other part may be called as a second time slot being configured for receiving data from the audio source device 100 and transmitting data. When a Bluetooth connection is used between the audio source device 100 and the transceiver 200, the second time slot may also be referred to as a "Bluetooth time slot". Whether the second time slot is required to be reserved may be determined depending on requirements.

In one embodiment, one first time slot comprises one broadcast anchor time slot and N broadcast retransmission time slots in series. N is a non-negative integer. The broadcast anchor time slot is configured to transmit M frames of the re-encoded audio data. The broadcast retransmission slot is configured to retransmit M frames of the re-encoded audio data. For example, N may be 2, 3, or 4, etc.; M may be 4, 6, or 8, etc. As used herein, a start time point of the broadcast anchor time slot is referred to as an anchor or a broadcast anchor. The second time slot comprises a receiving time slot for receiving data from the audio source device 100 and a transmitting time slot for transmitting data.

In FIG. 3, F->R in a solid line is the broadcast anchor time slot, and F->R in a broken line is the broadcast retransmission time slot. F->T is the transmission time slot between the transceiver 200 and the audio source device 100. T->F is the receiving time slot between the transceiver 200 and the audio source device 100. The transceivers 200 communicate with the source device 100 through the A2DP link to receive audio data and transmit data in the F->T and T->F time slots. In the F->R time slots, the transceiver 200 broadcasts the audio data to the receiving device 100 after being encoded.

In one embodiment, the communication time slot may further comprise a synchronization time slot Sync which is configured to transmit a synchronization sequence. The synchronization time slot may be sent immediately after the broadcast time slot. A transmission period of the synchronization time slot may be Y times of the broadcast interval, where Y is a positive integer. For example, Y may be 6, 9, 12, 15, or the like.

In one embodiment, the synchronization sequence may comprise a broadcast interval length configured to indicate an interval (length) between two consecutive broadcast anchors, such as 20 ms, and an application mode configured to indicate a current transmission mode. The application mode has a corresponding relationship with the broadcast interval and a volume.

The playing time of the audio data transmitted in one broadcast interval is exactly equal to the length of one broadcast interval. Both the transmitting of the audio data of the transceiver 200 and the receiving of the audio data of the receiving device 300 use the broadcast anchor as the synchronization reference point. The audio data is played in the devices 200 and 300 after delaying the same predetermined time which is also an integer multiple of the broadcast interval. Therefore, synchronous playback of the audio data in the devices 200 and 300 can be achieved without time stamps loaded for each frame of audio data.

The synchronization sequence may be broadcasted independently. The transmission period of the synchronization sequence can be set to reduce the broadcast number of the synchronization sequence, thereby further saving bandwidth consumption. It is not necessary to load the volume information for each frame of audio data by transmitting the application mode corresponding to the volume level in the synchronization sequence.

In one embodiment, the synchronization sequence may further comprise the number of broadcast retransmission which is configured to indicate the number of broadcast retransmission slots in the first time slot, for example, 2, 3, or 4 etc. Thus, a limited retransmission mechanism can be realized in the present invention. It can reduce the buffer and the delay of audio playing while resisting the burstiness of data transmission.

In one embodiment, the synchronization sequence may also comprise a Bluetooth clock configured for indicating a Bluetooth clock of the transceiver to receive the audio data synchronously; a device address configured for indicating an address of the transceiver so that the receiving side can distinguish different transmitting devices; an adaptive frequency hopping AFH channel mapping for negotiating useful channels; and an encoding type for indicating an encoding format and an encoding rate for indicating an encoding rate. For example, the audio data is encoded using Opus Codec and the encoding rate is 100 kbps. The application mode may have corresponding relationship with the broadcast interval, the number of broadcast retransmissions, the encoding type and the encoding rate, the volume level, and the like.

Specifically, the application mode comprises an outdoor high performance mode, an outdoor low delay mode, an indoor high performance mode and an indoor low delay mode. In one embodiment, the broadcast interval, the number of the broadcast retransmission, the encoding type, the encoding rate, and the volume level may be set according to the application mode. For example, in the indoor low-latency mode, a smaller broadcast interval, a larger encoding rate as well as a smaller volume can be set. The larger number of the broadcast retransmission, the lower encoding rate, and the larger volume can be set in consideration of anti-interference performance in the outdoor high-performance mode. The volume can be represented by different levels, such as a low volume level, a medium volume level, a high volume level, and the like.

In order to make better use of resources and provide better anti-interference and fading performance, the synchronization sequence can be transmitted on L channels. At this time, an interval between two adjacent synchronization sequences on two adjacent channels is one Lth of an interval between two adjacent synchronization sequences on the same channel, wherein L is a positive integer. When L is 3, a timing chart for transmitting the synchronization sequence is as shown in FIG. 4.

Figure 4:
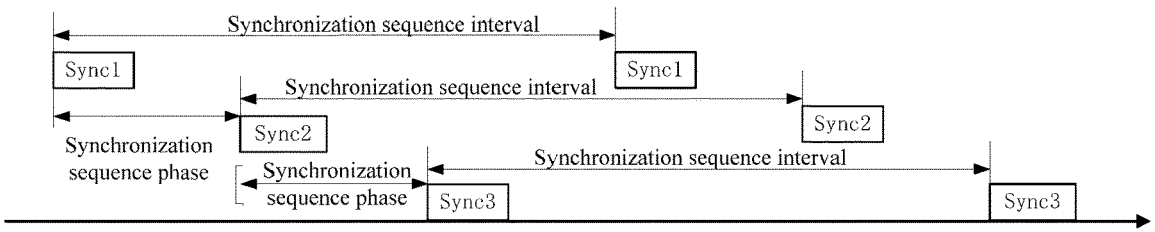
FIG. 4 is a timing diagram showing transmission of a synchronization sequence on three channels according to FIG. 2.

As shown in FIG. 4, when the synchronization sequence is transmitted on three channels at the same interval, the interval between two adjacent synchronization sequences on two adjacent channels is ⅓ of the interval between two adjacent synchronization sequences on the same channel. For example, when the synchronization sequence is transmitted using 2DH1 packets on 0, 37, and 78 channels respectively, the interval of two adjacent synchronization sequences on the same channel is 180 ms, namely 288 slots, which is 9 times of the broadcast interval which is 20 ms. The interval between two adjacent synchronization sequences on two adjacent channels is 60 ms, namely 96 slots, which is three times of the broadcast interval which is 20 ms.

At S204, the decoded audio data is played after delaying a predetermined time from an anchor of a first broadcast anchor slot. The predetermined time is used for synchronous playback of the audio data at one local end and one or more opposite ends. The predetermined time is X times of the broadcast interval, and X is a positive integer.

In one embodiment, the synchronization reference point for aligning the audio data played by the transceiver 200 and the receiving device 300 is the anchor of the first broadcast anchor slot. The predetermined time is a delayed play time of the audio data. The predetermined time also is a time reserved for decoding and processing the audio data before playing. Specifically, X can be set according to different application modes. For example, X can be 5, 6, 7, 8, or the like. The decoded audio data may be locally played with the volume level corresponding to the application mode. Thereby, the volume synchronization from one point to multiple points can be realized.

In one embodiment, the method at a broadcast transmitting end is configured for encoding audio data at a fixed interval to obtain a plurality of frames of encoded audio data; broadcasting M frames of the encoded audio data on a broadcast anchor time slot of a first time slot at a predetermined broadcast interval; and playing the audio data after delaying a predetermined time from an anchor of a first broadcast anchor slot. Thereby, synchronous playback of audio data from one point to multiple points is achieved without loading time stamps to each audio frame. The volume data does not need to be encapsulated in the audio data to achieve volume synchronization. In addition, the present invention can provide better anti-interference and fading performance, and better wireless resource distribution between the Bluetooth A2DP link and the broadcast.

Figure 5:
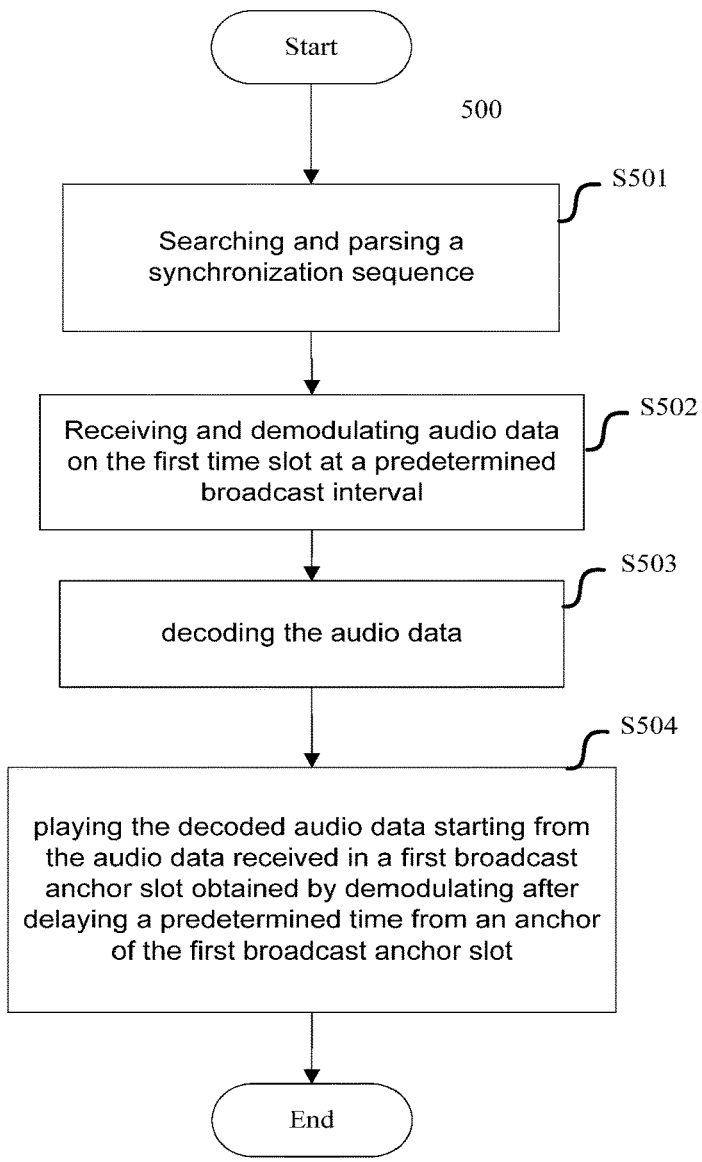
FIG. 5 is a flowchart of an audio data communication method performed by a receiving device according to one embodiment of the present invention.

FIG. 5 is a flowchart showing a method 500 for audio data communication performed by the receiving device 300 according to one embodiment of the present invention. It should be noted that the receiving device 300 in the embodiment is a receiving end. Therefore, the communication time slot, the broadcast interval, and the synchronization sequence used in the transceivers 200 in the previous embodiment are consistent with the communication time slot, the broadcast interval, and the synchronization sequence used in the receiving device 300 in the present embodiment, which is not repeated hereafter for simplicity.

As shown in FIG. 5, the audio data communication method 500 performed by the receiving device 300 comprises following operations. At S501, a synchronization sequence is searched and parsed to obtain a Bluetooth clock, a device address, an AFH channel mapping, a broadcast interval length, the number of broadcast retransmissions, an encoding type, an encoding rate and an application mode. In one embodiment, in addition to foregoing information carried in the synchronization sequence, the receiving device 300 may further obtain timing information according to a time point when the synchronization sequence starts. The timing information may be used to determine a time point when the broadcast time slot starts.

In one embodiment, the receiving device 300 may store the Bluetooth clock, the device address, the AFH channel mapping, the broadcast interval, the number of broadcast retransmission, the encoding type and the encoding rate, the application mode and the timing information obtained by parsing the synchronization sequence in a memory of a data and protocol processor.

At S502, the audio data on the first time slot at a predetermined broadcast interval is received and demodulated. In the receiving end, the audio signal on the first time slot at each broadcast interval is received. Then, the received audio signal is demodulated into audio data. As mentioned above, one broadcast time slot comprises one broadcast anchor slot and N broadcast retransmission slots. The audio data transmitted in the broadcast anchor slot are identical with the audio data transmitted in the N broadcast retransmission slots. Therefore, the receiving device 300 can determine whether to continue receiving in the broadcast retransmission slot based on signal quality of the demodulated audio data after receiving and demodulating the audio data in the broadcast anchor slot. Specifically, when the signal quality is good, for example, a CRC result of the demodulated audio data is correct, the receiving in the broadcast retransmission slot can be stopped. When the signal quality is not good enough, for example, the CRC result of the demodulated audio data is incorrect, the receiving in the broadcast retransmission slot can be continued in the broadcast interval.

Figure 6:
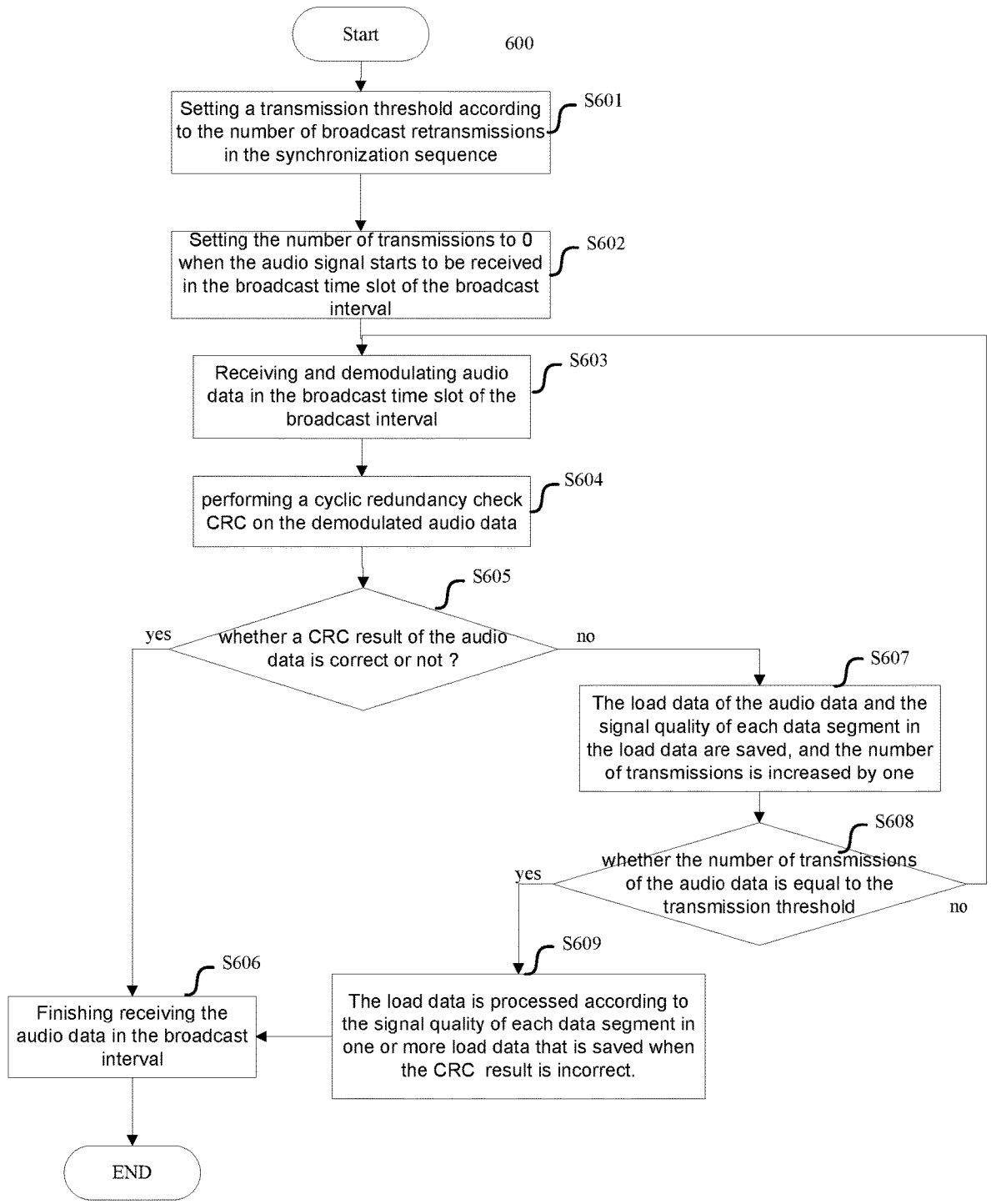
FIG. 6 is a flowchart of a method for determining whether to retransmit based on signal quality according to the second embodiment of the present invention.

FIG. 6 is a flowchart of a method 600 for determining whether to retransmit based on signal quality. As shown in FIG. 6, the method 600 for determining whether to retransmit based on signal quality according to the second embodiment of the present invention comprises following operations. At S601, a transmission threshold is set according to the number of broadcast retransmissions in the synchronization sequence. Specifically, the transmission threshold may be a sum of the number of broadcast retransmissions and 1.

At S602, the number of transmissions is set to 0 when the audio data starts to be received in the broadcast time slot of the broadcast interval. At S603, the audio data in the broadcast time slot of the broadcast interval is received and demodulated. At S604, a cyclic redundancy check CRC is performed on the demodulated audio data. At S605, it is determined whether a CRC result of the audio data is correct. The YES branch leads the method 600 to S606, and the No branch leads the method to S607. At S606, the receiving of the audio data in the broadcast interval is finished. Via the operations of S604-606, a load data with correct CRC results can be obtained for subsequent processing, such as decoding.

At S607, a load data of the audio data and signal quality of each of a plurality of data segments in the load data are saved, and the number of transmissions is increased by one. At S608, whether the number of transmissions of the audio data is equal to the transmission threshold is determined. When the number of transmissions is not equal to the transmission threshold, the method 600 returns to S603. When the number of transmissions is equal to the transmission threshold, the method goes to S609.

At S609, the load data is processed according to the signal quality of each of a plurality of data segments in one or more load data that is saved when the CRC result of the audio data is incorrect. Then, the method goes to S606. The signal quality is determined based on a signal angle difference before and after judgment for each of the plurality of data segments in each load data during demodulation. Specifically, the signal quality is determined based on a signal angle difference before and after judgment for each of the plurality of data segments in each load data during demodulation comprise:

dividing the load data into A data segments each comprising B symbols based on a length of the load data, wherein A is a natural number greater than or equal to 1 and B is a natural number greater than 1;

calculating a complex signal angle θ before judgment and a data angle $\acute{\theta}$ after judgment during demodulation for each symbol separately;

calculating an absolute value Δθ=|θ−$\acute{\theta}$| of a difference between the complex signal angle θ and the data angle $\acute{\theta}$ for each symbol;

calculating $\overline{\Delta\theta}$ of each of the A data segments separately, wherein $\overline{\Delta\theta}$ is an average value of B Δθ corresponding to the B symbols in each data segment; determining the signal quality of each data segments according to $\overline{\Delta\theta}$ of each data segments.

In one embodiment, the signal quality of the data segment is determined as a first state if the signal quality $\overline{\Delta\theta}$ of the data segment is less than or equal to a preset threshold, otherwise, the signal quality of the data segment is determined as a second state. Specifically, the first state may be, for example, normal, available, etc., and the second state may be abnormal, abnormal, unavailable, and the like. The preset threshold value may be set to values such as 5 degrees, 8 degrees, 10 degrees, or the like.

For example, when DQPSK or D8PSK modulation is used, A can be preset firstly by a relevant person considering the calculation amount and the data quality to be obtained. Generally, the larger the A is, the larger the calculation amount is, and the higher the data quality after processed is. If A is set in advance, B can be determined according to the length of the load data and A. Specifically, B=the length of the load data/A.

In another embodiment, B can also be preset firstly, and the number of data segments A is determined according to the length of the load data and the length B of each data segment. Specifically, A=the length of the load data/B. For example, if the length B of each data segment is set to 10, that is, each data segment comprises 10 symbols. When the length of the load data is 100 symbols, A=100/10=10. When the length of the load data is 80 symbols, A=80/10=8.

When there is one saved load data, the one saved load data with the incorrect CRC result is regarded as the processed load data and it is indicated that the signal quality is the segment data in the second state. In some cases, for example, when there is a serious packet loss, if only one data packet with incorrect CRC result is received after a plurality of times of retransmission. Whether each data segment is normal may be determined based on an average value $\overline{\Delta\theta}$ of absolute values of angle differences corresponding to each data segment provided by a segment signal quality estimator. If each data segment is normal, it may be considered that the load data is not seriously interfered and affected, and the load data is sent to the audio decoder for decoding. On the contrary, the data segment is discarded, the data packet is considered to be lost, or the audio decoder is instructed to perform PLC (Packet Loss Concealment) processing.

When there is a plurality of saved load data, the load data is processed according to the signal quality of each of a plurality of data segments in more load data that is saved when the CRC result of the audio data is incorrect comprises: selecting A data segments having minimum $\overline{\Delta\theta}$ from corresponding data segments in the saved load data respectively, and combining the A data segments having minimum $\overline{\Delta\theta}$ into one new combined load data; regarding the new combined load data as the processed load data and indicating the signal quality is the segment data in the second state.

When there are two or more data packets with incorrect CRC results, data with optimal quality in each data segment corresponding to the plurality of data packets may be selected. Namely, data whose average value $\overline{\Delta\theta}$ of absolute values of angle differences corresponding to each data segment is the minimum may be selected to form a new data packet. Then, whether each data segment in the new data packet is normal is determined. If each data segment in the new data packet is normal, it may be considered that the signal quality of each data segment in the new data packet is not seriously interfered and affected, the new data packet is sent to the audio decoder for decoding. It is indicated that the signal quality is the segment data in the second state. On the contrary, the new data packet is processed as a lost packet, or the audio decoder is instructed to perform PLC processing.

In one embodiment, when the saved load data is multiple, the load data is processed according to the signal quality of each data segment in the plurality of load data that is saved in the CRC result, comprises: selecting the smallest data segment from the A corresponding data segments of the plurality of load data whose pre-stored CRC result is incorrect, and combining the A minimum data segments into new load data; using the new load data as the processed load data and indicating that the signal quality is the data segment of the second state.

In one embodiment, when the synchronization fails or an error occurs in the receiving packet header, the data packet is considered to be lost, and the PLC processing is performed later. The load data is processed based on a signal quality of each of the plurality of data segments in one or more pre-saved load data with incorrect CRC results if the number of transmissions is equal to the transmission threshold. As a result, the load data having the incorrect CRC result but having good signal quality is used to compensate data loss to the audio data, thereby effectively improving the reliability of limited retransmission data and the performance of broadcast communication.

At S503, the audio data is decoded. In one embodiment, decoding is performed by using a decoding algorithm corresponding to the encoding type used in the transceiver 200. The encoding type used in the transceiver 200 can be obtained from the synchronization sequence.

At S504, the decoded audio data starting from the audio data received on the first broadcast anchor slot is played after delaying a predetermined time from an anchor of the first broadcast anchor slot. The predetermined time is X times of the broadcast interval, X is a positive integer, and the predetermined time is a delayed play time of the audio data at one or more opposite ends.

In one embodiment, the synchronization reference point for aligning the audio data played by the transceiver 200 and the receiving device 300 is the anchor of the first broadcast anchor slot. The predetermined time is a delayed play time of the audio data. The predetermined time also is a time reserved for decoding and processing the audio data before playing. Specifically, X can be set according to different application modes. For example, X can be 5, 6, 7, 8, or the like.

In one embodiment, the decoded audio data may be locally played with corresponding volume level in the application mode in the synchronization sequence searched at S501. Thereby, the volume synchronization from one point to multiple points can be realized while the synchronous playing from one point to multiple points is realized.

In one embodiment, a clock deviation between the receiving device and the transceiver may cause audio sampling deviation, and the accumulation of sampling deviation may result in loss of synchronization. To overcome this problem, the method further comprises: determining a clock frequency deviation between the transmitting device and the receiving device according to synchronization information obtained at the time of demodulation; adjusting a playing clock according to the clock frequency deviation. That is, if the synchronization information provided by the baseband processor indicates that the clock of the receiving device is faster than the transceiver, the clock for audio playing is slowed down; otherwise, the clock for audio playing is accelerated.

In the audio data communication method according to the second embodiment of the present invention, the decoded audio data starting from the audio data received on the first broadcast anchor slot is played after delaying a predetermined time from an anchor of the first broadcast anchor slot. Thereby, synchronized playing of the audio from one point to multiple points can be achieved.

In the audio data communication method according to the second embodiment of the present invention, the load data is processed based on a signal quality of each of the plurality of data segments in one or more pre-saved load data with incorrect CRC results if the number of transmissions is equal to the transmission threshold. As a result, the load data having the incorrect CRC result but having good signal quality is used to compensate data loss to the audio data, thereby effectively improving the reliability of limited retransmission data and the performance of broadcast communication.

Figure 7:
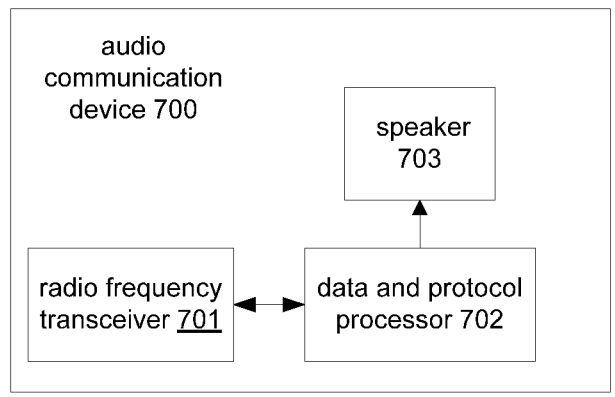
FIG. 7 is a schematic structural diagram of an audio communication device according to one embodiment of the present invention.

In one embodiment, a device for audio data communication is also provided. The principle of the audio communication device in the embodiment is similar to that of the audio communication method 400 of FIG. 2. Therefore, the implementation of the audio communication device in the present embodiment may be referred to the method 400 provided above. FIG. 7 is a schematic structural diagram of a device 700 for audio data communication according to one embodiment of the present invention. The audio communication device 700 may be one of a plurality of devices having an audio playing function, such as a smart phone, an earphone, or a speaker, etc.

As shown in FIG. 7, the audio communication device 700 comprises a radio frequency transceiver 701, a data and protocol processor 702 and a speaker 703. The data and protocol processor 702 is configured to encode audio data at a fixed interval to obtain a plurality of frames of encoded audio data. The radio frequency transceiver 701 is configured to broadcast M frames of the audio data on a broadcast anchor time slot of a first time slot at a predetermined broadcast interval. The speaker 703 is configured to play the audio data after delaying a predetermined time from an anchor of a first broadcast anchor slot. The predetermined time is configured for synchronous playback of the audio data at one local end (namely the audio communication device 700) and one or more opposite ends, the predetermined broadcast interval is M times of the fixed interval, M is a positive integer, the predetermined time is X times of the broadcast interval, and the X is a positive integer.

In one embodiment, one broadcast interval comprises one first time slot for broadcasting the encoded audio data. One first time slot comprises one broadcast anchor time slot and N broadcast retransmission time slots in series. The broadcast anchor time slot is configured for transmit M frames of the encoded audio data. Each of the broadcast retransmission time slots is configured to retransmit the M frames of the encoded audio data, and N is a non-negative integer.

In one embodiment, each broadcast interval further comprises a second time slot configured for receiving data from a audio source device and transmitting data. The second time slot comprises a receiving time slot and a transmitting time slot. The radio frequency transceiver 701 is further configured to receive and demodulate audio data from the audio source device 100 in the second time slot. The data and protocol processor 702 is further configured to decode the demodulated audio data and then encode the decoded audio data at the fixed interval.

In one embodiment, the radio frequency transceiver 701 is further configured to broadcast a synchronization sequence with a period of Y times of the broadcast interval. The synchronization sequence comprises a broadcast interval length being configured to indicate an interval length between two consecutive broadcast anchors and an application mode being configured to indicate a current transmission mode. The application mode has corresponding relationship with the broadcast interval and a volume. The audio data is played with delay of the predetermined time and the volume corresponding to the application mode, and the Y is a positive integer.

Since the playing time of the audio data transmitted in one broadcast interval is exactly equal to the length of one broadcast interval, both the receiving of the audio data and the transmitting of the audio data use the broadcast anchor as the synchronization reference point. The audio data is played after delaying the same predetermined time which is also an integer multiple of the broadcast interval. Therefore, synchronous playback of the audio data in the present invention can be achieved from one point to multiple points without time stamps loaded for each frame of audio data.

The synchronization sequence may be broadcasted independently. The transmission period of the synchronization sequence can be set to reduce the broadcast number of the synchronization sequence, thereby further saving bandwidth consumption. It is not necessary to load the volume information for each frame of audio data because the application mode with the volume level is comprised in the synchronization sequence.

In one embodiment, the synchronization sequence further comprises the number of broadcast retransmission which is configured to indicate the number of broadcast retransmission slots in the first time slot, for example, 2, 3, or 4, etc. Thus, a limited retransmission mechanism can be achieved. It can reduce the buffer and the delay of audio playing while resisting burstiness of data transmission.

In one embodiment, the synchronization sequence may also comprise the following information:

a Bluetooth clock configured for indicating a Bluetooth clock of the transceiver to received the audio data synchronously;

a device address configured for indicating an address of the transceiver, so that the receiving side can distinguish different transmitting devices;

an adaptive frequency hopping AFH channel mapping for negotiating useful channels;

an encoding type for indicating an encoding format and an encoding rate for indicating an encoding rate. For example, the audio data is encoded using Opus Codec, and the encoding rate is 100 kbps.

The application mode may have a corresponding relationship with the broadcast interval, the number of broadcast retransmissions, the encoding type and the encoding rate, the volume level, and the like. In one embodiment, the synchronization sequence can be transmitted on L channels. At this time, the interval between two adjacent synchronization sequences on two adjacent channels is one Lth of an interval between two adjacent synchronization sequences on the same channel. L is a positive integer. In one embodiment, the speaker 703 is further configured to play the audio data at the volume level corresponding to the application mode after delaying a predetermined time.

In the present invention, the device at a broadcast transmitting end is configured for encoding audio data at a fixed interval to obtain a plurality of frames of encoded audio data; broadcasting M frames of the encoded audio data on a broadcast anchor time slot of a first time slot at a predetermined broadcast interval; and, playing the audio data after delaying a predetermined time from an anchor of a first broadcast anchor slot. The device at a broadcast receiving end is configured for playing the decoded audio data starting from the audio data received on the first broadcast anchor slot after delaying a predetermined time from an anchor of the first broadcast anchor slot. Thereby, synchronous playback of audio at the broadcast receiving end and the broadcast transmitting end is achieved without loading time stamp to each frame of audio data.

The volume synchronization and the playing synchronization can be achieved without the volume data and the time stamp encapsulated in the audio data in the present invention. In addition, better anti-interference and fading performance, and better wireless resource distribution between the Bluetooth A2DP link and the broadcast can be provided in the present invention.

In one embodiment, a device for audio data communication is also provided. The principle of the audio communication device is similar to that of the audio communication method shown in FIG. 2. Therefore, the implementation of the audio communication device can be referred to the method of FIG. 2.

Figure 8:
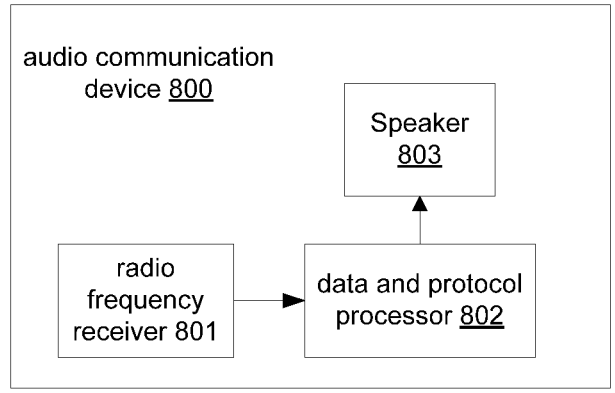
FIG. 8 is a schematic structural diagram of an audio communication device according to one embodiment of the present invention.

FIG. 8 is a schematic structural diagram of a device 800 for audio data communication according to one embodiment of the present invention. The audio communication device 800 may be one of a plurality of devices having an audio playing function, such as a smart phone, an earphone, or a speaker. As shown in FIG. 8, the audio communication device 800 comprises a radio frequency transceiver 801, a data and protocol processor 802 and a speaker 803. The radio frequency receiver 801 is configured for receiving and demodulating audio data on a broadcast anchor slot of a first time slot at a predetermined broadcast interval. The data and protocol processor 802 is configured for decoding the audio data. The speaker 803 is configured for playing the decoded audio data starting from the audio data received on a first broadcast anchor slot after delaying a predetermined time from an anchor of the first broadcast anchor slot. The predetermined time is X times of the broadcast interval, X is a positive integer, and the predetermined time is a delayed play time of the audio data at one local end and one or more opposite ends.

In one embodiment, the radio frequency receiver 801 is further configured to search and parse a synchronization sequence to obtain following information: a broadcast interval length for indicating an interval length between two consecutive broadcast anchors; and an application mode for indicating a current transmission mode. The application mode has corresponding relationship with the broadcast interval and a volume. The audio data is played with delay of the predetermined time and the volume corresponding to the application mode.

In one embodiment, the radio frequency receiver searches and parses the synchronization sequence to further obtain following information:

the number of broadcast retransmission being configured to indicate the number of broadcast retransmission slots in the first time slot;

a Bluetooth clock being configured to indicate a Bluetooth clock of a transmitting device;

a device address indicating an address of the transmitting device;

an adaptive frequency hopping channel mapping for negotiating useful channels; and/or, an encoding type for indicating an encoding format and an encoding rate for indicating an encoding rate.

The application mode has corresponding relationship with the number of broadcast retransmissions, the encoding type and the encoding rate. In one embodiment, the audio communication device 800 further comprises a baseband processor configured to perform a cyclic redundancy check CRC on the demodulated audio data, and inform the radio frequency receiver 801 to finish the receiving of the audio data in the broadcast interval if a CRC result of the audio data is correct; and a signal quality estimator configured to obtain a signal angle difference before and after judgment of each of a plurality of data segments in each load data from the radio frequency receiver 801; and determine the signal quality of each of the plurality of data segments in the load data according to the signal angle difference before and after judgment of each of the plurality of data segments in each load data during demodulation. The data and protocol processor is further configured to: obtain a CRC result of the audio data and corresponding load data from the baseband processor, save a load data of the audio data and the signal quality of each of the plurality of data segments in the load data, increase the number of transmissions of the audio data and determine whether the number of transmissions is equal to a transmission threshold if the CRC result of the audio data is incorrect, continue receiving the audio data in the broadcast interval if the number of transmissions is not equal to the transmission threshold, and process the load data based on the signal quality of each of the plurality of data segments in one or more pre-saved load data with incorrect CRC results if the number of transmissions is equal to the transmission threshold. The signal quality is determined based on a signal angle difference before and after judgment for each of the plurality of data segments in each load data during demodulation.

In one embodiment, the signal quality estimator comprises: a splitting unit configured for dividing the load data into A data segments each comprising B symbols based on a length of the load data, wherein A is a natural number greater than or equal to 1 and B is a natural number greater than 1; a first calculating unit configured for calculating a complex signal angle $\theta$ before judgment and a data angle $\acute{\theta}$ after judgment during demodulation for each symbol separately; a second calculating unit configured for calculating an absolute value $\Delta\theta=|\theta-\acute{\theta}|$ of a difference between the complex signal angle $\theta$ and the data angle $\acute{\theta}$ for each symbol; a third calculating unit configured for calculating $\overline{\Delta\theta}$ of each of the A data segments separately, wherein $\overline{\Delta\theta}$ is an average value of B $\Delta\theta$ corresponding to the B symbols in each data segment; a first determining unit, configured for determining that the signal quality of the data segment is a first state if the signal quality $\overline{\Delta\theta}$ of the data segment is less than or equal to a preset threshold, otherwise, determining that the signal quality of the data segment is a second state.

When there is one pre-saved load data, the data and protocol processor is configured for: regarding the one pre-saved load data with the incorrect CRC result as the processed load data and indicating the signal quality is the segment data in the second state. When there is a plurality of pre-saved load data, the data and protocol processor is configured for: selecting A data segments having minimum $\overline{\Delta\theta}$ from corresponding data segments in the pre-saved load data respectively, and combining the A data segments having minimum $\overline{\Delta\theta}$ into one new combined load data; and regarding the new combined load data as the processed load data and indicating the signal quality is the segment data in the second state.

The data and protocol processor is further configured for determining a clock frequency deviation between the transmitting device that transmits the audio data and the receiving device that receives the audio data according to synchronization information obtained at the time of demodulation; adjusting a playing clock according to the clock frequency deviation.

In the audio data communication device according to one embodiment of the present invention, the decoded audio data starting from the audio data received on the first broadcast anchor slot is played after delaying a predetermined time from an anchor of the first broadcast anchor slot. Thereby, synchronized playing of the audio data from one point to multiple points can be achieved. Both the transmitting device and the receiving device play the audio data at the volume level corresponding to the application mode. Thereby, the volume synchronization can be achieved without the time stamp encapsulated in the audio data.

In the audio data communication device according to one embodiment of the present invention, the load data is processed based on a signal quality of each of the plurality of data segments in one or more pre-saved load data with incorrect CRC results if the number of transmissions is equal to the transmission threshold. As a result, the load data having the incorrect CRC result but having good signal quality is used to compensate data loss to the audio data, thereby effectively improving the reliability of limited retransmission data and the performance of broadcast communication.

Based on the same inventive concept, a system for audio data communication is also provided in the fifth embodiment of the present invention. The principle of the system for audio data communication is similar to the methods in the first embodiment and the second embodiment. Therefore, the implementation of the audio communication system in the fifth embodiment of the present invention can refer to the methods in the first embodiment and the second embodiment.

Figure 9:
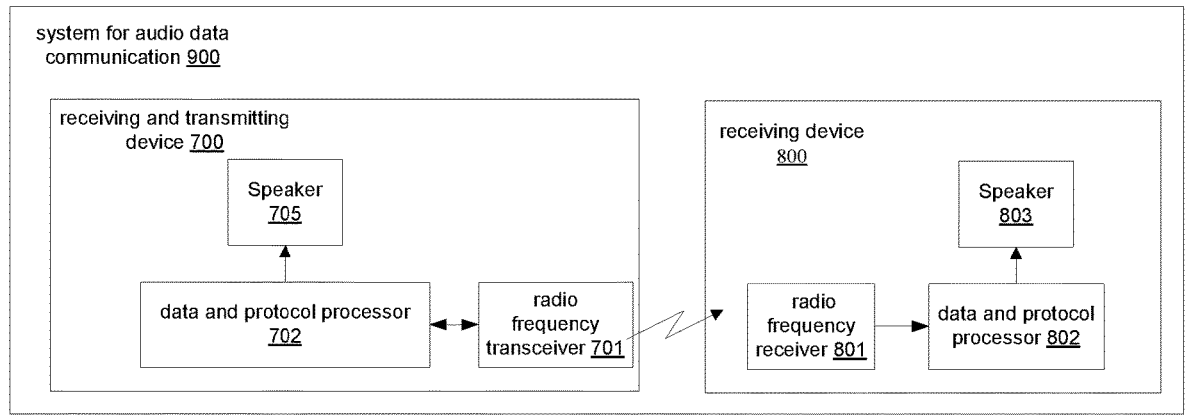
FIG. 9 is a schematic structural diagram of an audio communication system according to one embodiment of the present invention.

FIG. 9 is a schematic structural diagram of a system 900 for audio data communication according to the fifth embodiment of the present invention. As shown in FIG. 9, the system 900 for audio data communication comprises: a transceiver 700 and one or more receiving devices 800. The transceiver 700 in FIG. 9 refers to the transceiver 700 as discussed above, which is not described hereafter again. The receiving device 800 in FIG. 9 refers to the receiving device 800 as discussed above, which is not described hereafter again.

In the audio data communication system 900, the audio data after delaying a predetermined time from an anchor of a first broadcast anchor slot is played on the transceiver 700, and the audio data after delaying a predetermined time from an anchor of the first broadcast anchor slot is played one the receiving device 800. The receiving device 700 and the transceiver 800 have the same synchronization reference point and the same delayed play time. Thereby, synchronized playing of the audio data from one point to multiple points can be achieved. Both the transceiver and the receiving device play the audio data at the volume level corresponding to the application mode. Thereby, the volume synchronization can be achieved without the time stamp encapsulated in the audio data.

In the audio data communication system according to the fifth embodiment of the present invention, the load data is processed based on a signal quality of each of the plurality of data segments in one or more pre-saved load data with incorrect CRC results if the number of transmissions is equal to the transmission threshold. As a result, the load data having the incorrect CRC result but having good signal quality is used to compensate data loss to the audio data, thereby effectively improving the reliability of limited retransmission data and the performance of broadcast communication.

Figure 10:
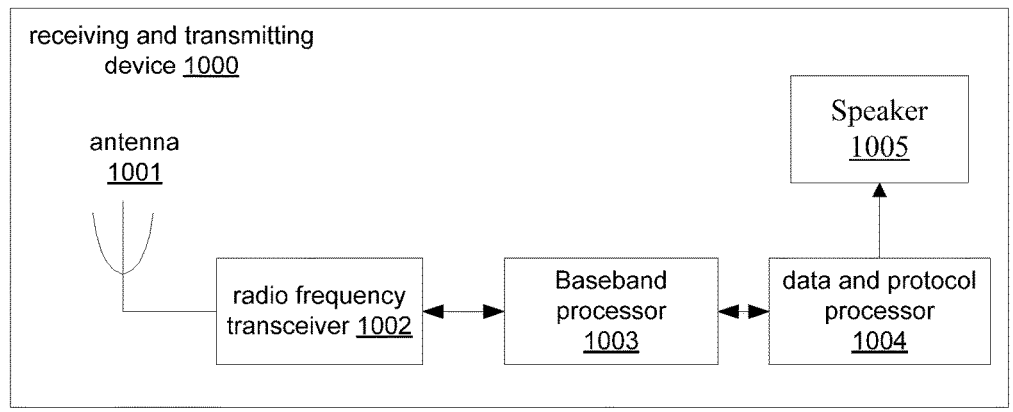
FIG. 10 is a schematic structural diagram of a transceiver according to one embodiment of the present invention.

For a better understanding of the present invention, the present invention will be described in detail below by taking a specific implementation scenario as an example. FIG. 10 is a schematic structural diagram of a transceiver 1000 according to the sixth embodiment of the present invention. As shown in FIG. 10, the transceiver 1000 comprises: an antenna 1001, a radio frequency transceiver 1002, a baseband processor 1003, a data and protocol processor 1004 and a speaker 1005. The transceiver 1000 receives wireless signal sent by the audio source device 100 through the antenna 1001, demodulates the wireless signal into a digital baseband signal by the radio frequency transceiver 1002, parsed the digital baseband signal to obtain load data by the digital baseband processor, and decode the load data by the data and the protocol processor 1004. The data and protocol processor 1004 comprises a microprocessor and a memory. The decoded audio data is not only sent to the local speaker for playing, but also re-encoded by the data and protocol processor 1004 at a fixed interval and in a predetermined encoding format, sent to the baseband processor for processing as a digital baseband signal, and then modulated by the RF transceiver 1002. The RF signal is sent to the receiving device through the antenna 1001 finally.

Figure 11:
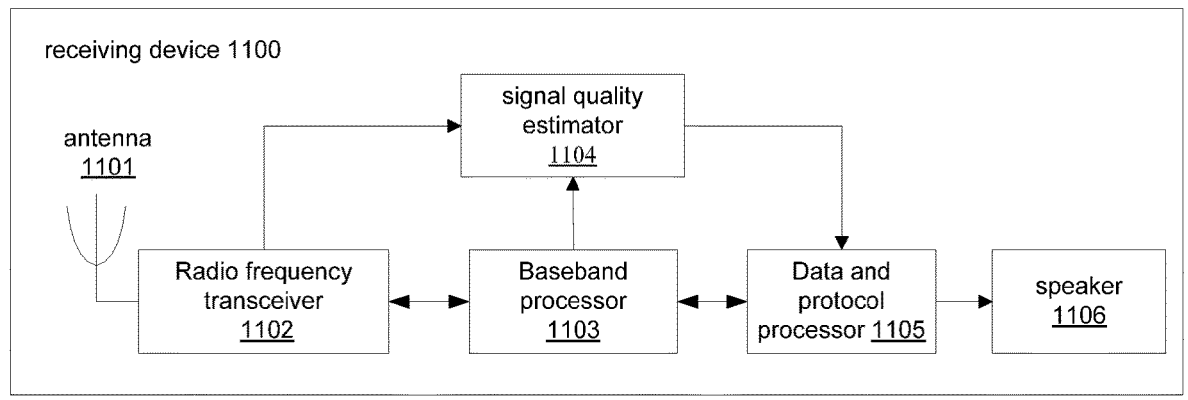
FIG. 11 is a schematic structural diagram of a receiving device according to one embodiment of the present invention.

FIG. 11 is a schematic structural diagram of a receiving device 1100 according to the sixth embodiment of the present invention. As shown in FIG. 11, the receiving device 1100 comprises an antenna 1101, a radio frequency transceiver 1102, a baseband processor 1103, a signal quality estimator 1104, a data and protocol processor 1105 and a speaker 1106. The antenna 1101 receives a RF signal. The RF signal is converted into a digital baseband signal by the RF receiver 1102. The baseband processor 1103 processes the digital baseband data to provide a CRC result and load data to the data and protocol processor 1105. The signal quality estimator 1104 is configured to estimate the signal quality of the demodulated data and to send the estimated signal quality information to the data and protocol processor 1105 as a basis for erroneous data reconstruction. The data and protocol processor 1105 is responsible for processing the audio data with correct CRC result or incorrect CRC result, communication protocol processing, and audio post processing. The data and protocol processor 1105 comprises a microprocessor and a memory. The microprocessor performs a program for executing data and protocol processing. The memory is configured for storing data and protocol code, and the like. The signal quality estimator 1104 evaluates the quality of the baseband data, or the severity of the interference, by calculating a decision error of the baseband signal.

The transceiver 1000 connects to the audio source device 100 through radio frequency wireless communication, and receives the audio signal transmitted by the audio source device through radio frequency. The transceiver 100 establishes an A2DP link with the audio source device according to the Bluetooth protocol. The audio source device transmits the audio data encoded by the SBC coding to the transceiver 1000. The transceiver 1000 forwards the audio signal to a plurality of receiving devices 1100 through the broadcast protocol while playing the audio signal locally.

In the sixth embodiment, an encoding type between the transceiver 1000 and the receiving device 1100 is Opus coding, an encoding rate is about 100 kbps, a length of one frame of encoded audio data is 10 ms, each frame has about 125 bytes, and each two frames of encoded audio data form a data packet load, about 375 bytes, 2DH3 packet type with extended length of classic Bluetooth is used, and each 2DH3 packet occupies 4 slots. In the transceiver 1000, the receiving function and the transmitting function share the antenna, the radio frequency transceiver and the baseband processor through a time division multiplexing (TDM) technique.

The broadcast interval is fixed in time division multiplexed time slots. The time slot resource is divided into two parts in one broadcast interval. One part is a broadcast time slot, and the other part is a Bluetooth time slot. The broadcast interval is 20 ms and comprises 32 slots. During each broadcast interval, the broadcast packet 2DH3 is transmitted 3 times. That is, the broadcast packet 2DH3 is transmitted one time in the broadcast anchor time slot and is retransmitted twice in the retransmission time slots, 12 slots are occupied in total. That is to say, 12 slots among the 32 slots in the broadcast interval are used for broadcasting, and 20 slots are used for the A2DP link connection between the audio source device and the transceiver 1000.

The synchronization sequence is transmitted on 0, 37, and 78 channels using 2DH1. The interval of the synchronization sequence is 180 ms which is 288 slots and is 9 times of the broadcast interval. The interval between two adjacent synchronization sequences on two adjacent channels is 60 ms which is 96 slots and is three times of the broadcast interval. The application mode in the synchronization sequence is set to the indoor high performance mode, and the corresponding volume is medium volume.

A total delay playing time corresponding to the indoor high performance mode is set to 360 ms. The transceiver 1000 receives the A2DP data packet from the audio source device, broadcasts after buffering 240 ms of the audio data, and starts playing after buffering 360 ms of the audio data. Namely, the audio data is started to be played after delaying 120 ms from beginning of broadcast. After receiving the broadcast data, the receiving device 1100 also start playing after buffering 120 ms of the audio data.

Provided that the predetermined time is 120 ms, both the transceiver 1000 and the receiving device 1100 use the broadcast anchor of the first broadcast anchor time lot as the synchronization reference point. The audio data received firstly starts being played from the $6^{th}$ anchor of the broadcast anchor slot. Therefore, synchronous playback of the audio data at the transceiver 1000 and the receiving device 1100 can be achieved without time stamps loaded for each frame of audio data.

The A2DP data received from the source device is buffered for 240 ms, and there is sufficient time to solve the audio packet loss problem caused by the burstiness of the wireless channel. The broadcasted audio data is buffered for 120 ms, and there is enough time for decoding and audio post-processing, for example, PLC processing for packet loss and data loss.

In one embodiment, the synchronization information provided by the baseband processor of the receiving device may also be used to adjust a sampling frequency of the digital-to-analog converter for audio playing. That is, if the synchronization result provided by the baseband processor indicates that the clock of the receiving device is faster than the transceiver, the clock of the digital-to-analog converter for audio playing is slowed down. Conversely, the clock of the digital-to-analog converter for audio playing is accelerated. Since the clock deviation of Bluetooth is specified in the range of +/−40 ppm, the clock of the digital-to-analog converter can be adjusted in a smaller adjustment step.

In the audio data communication system, the audio data after delaying a predetermined time from an anchor of a first broadcast anchor slot is played on the transceiver 1000, and the audio data after delaying a predetermined time from an anchor of the first broadcast anchor slot is played on the receiving device 1100. The receiving device 1100 and the transceiver 1000 have the same synchronization reference point and the same delayed play time. Thereby, synchronized playing of the audio data from one point to multiple points can be achieved. Both the transceiver and the receiving device play the audio data at the volume level corresponding to the application mode. Thereby, the volume synchronization can be achieved without the time stamp encapsulated in the audio data.

In the audio data communication system according to the sixth embodiment of the present invention, the load data is processed based on a signal quality of each of the plurality of data segments in one or more pre-saved load data with incorrect CRC results if the number of transmissions is equal to the transmission threshold. As a result, the load data having the incorrect CRC result but having good signal quality is used to compensate data loss to the audio data, thereby effectively improving the reliability of limited retransmission data and the performance of broadcast communication.

In addition, the present invention can provide better anti-interference and fading performance, and better wireless resource distribution between the Bluetooth A2DP link and the broadcast.

The present invention has been described in sufficient detail with a certain degree of particularity. It is understood to those skilled in the art that the present disclosure of embodiments has been made by way of examples only and that numerous changes in the arrangement and combination of parts may be resorted without departing from the spirit and scope of the invention as claimed. Accordingly, the scope of the present invention is defined by the appended claims rather than the forgoing description of embodiments.

I claim:

1. A method for audio data communication, comprising:
encoding audio data at a fixed interval to obtain a plurality of frames of encoded audio data;
broadcasting M frames of the encoded audio data in a broadcast anchor time slot in a first time slot at a predetermined broadcast interval; and
playing the audio data after delaying a predetermined time from an anchor of the first broadcast anchor slot, wherein the predetermined time is configured for synchronous playback of the audio data at one local end and one or more opposite ends, the predetermined broadcast interval is M times of the fixed interval, the predetermined time is X times of the broadcast interval, M is a positive integer, and X is a positive integer.

2. The method according to claim 1, wherein one broadcast interval comprises a first time slot including the broadcast anchor time slot and N broadcast retransmission time slots in series, the broadcast anchor time slot is configured for transmitting the M frames of the encoded audio data, each of the broadcast retransmission time slots is configured to retransmit the M frames of the encoded audio data, and N is a non-negative integer.

3. The method according to claim 2, further comprising:
broadcasting a synchronization sequence with a period of Y times of the broadcast interval, wherein the synchronization sequence includes a broadcast interval length to indicate an interval length between two consecutive broadcast anchors and an application mode to indicate a current transmission mode, wherein the application mode has a corresponding relationship with the broadcast interval and a volume, the audio data is played back with a delay of the predetermined time and the volume corresponding to the application mode, and the Y is a positive integer.

4. The method according to claim 3, wherein the synchronization sequence further comprises:
the number of broadcast retransmission to indicate the number of broadcast retransmission slots in the first time slot;
a Bluetooth clock to indicate a Bluetooth clock of a transmitting device;
a device address indicating an address of the transmitting device;
an adaptive frequency hopping channel mapping for negotiating useful channels; and/or,
an encoding type for indicating an encoding format and an encoding rate for indicating an encoding rate, wherein the application mode has a corresponding relationship with the number of broadcast retransmissions, the encoding type and the encoding rate.

5. The method according to claim 3, wherein when the synchronization sequence is transmitted on L channels, an interval between two adjacent synchronization sequences on two adjacent channels is one Lth of an interval between two adjacent synchronization sequences on the same channel, wherein L is a positive integer.

6. The method according to claim 2, wherein the broadcast interval further comprises a second time slot configured for receiving data from a audio source device and transmitting data, and the second time slot comprises a receiving time slot and a transmitting time slot, the method further comprises:
receiving an audio signal from the audio source device in the second time slot; and
demodulating and decoding the audio signal to obtain the audio data to be transmitted.

7. A method for audio data communication, comprising:
receiving and demodulating audio data on a broadcast anchor slot in a first time slot at a predetermined broadcast interval;
decoding the audio data; and
playing the decoded audio data starting from the audio data received on the first broadcast anchor slot after delaying a predetermined time from an anchor of the first broadcast anchor slot, wherein the predetermined time is X times of the broadcast interval, X is a positive integer, and the predetermined time is a delayed play time of the audio data at one or more opposite ends.

8. The method according to claim 7, wherein before receiving and demodulating audio data in the broadcast anchor slot of the first time slot at the predetermined broadcast interval, the method further comprises:
   searching and parsing a synchronization sequence to obtain:
      a broadcast interval length for indicating an interval length between two consecutive broadcast anchors; and
      an application mode for indicating a current transmission mode, wherein the application mode has corresponding relationship with the broadcast interval and a volume, the audio data is played with delay of the predetermined time and the volume corresponding to the application mode, and the Y is a positive integer.

9. The method according to claim 8, wherein the searching and parsing a synchronization sequence to further obtain:
   the number of broadcast retransmission to indicate the number of broadcast retransmission slots in the first time slot;
   a Bluetooth clock to indicate a Bluetooth clock of a transmitting device;
   a device address indicating an address of the transmitting device;
   an adaptive frequency hopping channel mapping for negotiating useful channels; and/or,
   an encoding type for indicating an encoding format and an encoding rate for indicating an encoding rate, wherein the application mode has corresponding relationship with the number of broadcast retransmissions, the encoding type and the encoding rate.

10. The method according to claim 9, wherein after receiving and demodulating the audio data and before decoding the audio data, the method further comprises:
   performing a cyclic redundancy check CRC on the demodulated audio data;
   finishing the receiving of the audio data in the broadcast interval if a CRC result of the audio data is correct;
   saving a load data of the audio data and a signal quality of each of a plurality of data segments in the load data, increasing the number of transmissions of the audio data and determining whether the number of transmissions is equal to a transmission threshold if the CRC result of the audio data is incorrect;
   continuing receiving the audio data in the broadcast interval if the number of transmissions is not equal to the transmission threshold;
   processing the load data based on a signal quality of each of the plurality of data segments in one or more pre-saved load data with incorrect CRC results if the number of transmissions is equal to the transmission threshold; and
   wherein the signal quality is determined based on a signal angle difference before and after judgment for each of the plurality of data segments in each load data during demodulation.

11. The method according to claim 10, wherein the signal quality is determined based on a signal angle difference before and after judgment for each of the plurality of data segments in each load data during demodulation comprises:
   dividing the load data into A data segments each comprising B symbols based on a length of the load data, wherein A is a natural number greater than or equal to 1 and B is a natural number greater than 1;
   calculating a complex signal angle $\theta$ before judgment and a data angle $\phi$ after judgment during demodulation for each symbol separately;
   calculating an absolute value $\Delta\theta = |\theta - \phi|$ of a difference between the complex signal angle $\theta$ and the data angle $\phi$ for each symbol;
   calculating $\overline{\Delta\theta}$ of each of the A data segments separately, wherein $\overline{\Delta\theta}$ is an average value of B $\Delta\theta$ corresponding to the B symbols in each data segment;
   determining that the signal quality of the data segment is a first state if the signal quality $\overline{\Delta\theta}$ of the data segment is less than or equal to a preset threshold, otherwise, determining that the signal quality of the data segment is a second state.

12. The method according to claim 11, wherein when there is one pre-saved load data, the processing the load data based on a signal quality of each of the plurality of data segments in one or more pre-saved load data with incorrect CRC results comprises:
   regarding the one pre-saved load data with the incorrect CRC result as the processed load data and indicating the signal quality is the segment data in the second state.

13. The method according to claim 11, wherein when there is a plurality of pre-saved load data, the processing the load data based on a signal quality of each of the plurality of data segments in one or more pre-saved load data with incorrect CRC results comprises:
   selecting A data segments having minimum $\overline{\Delta\theta}$ from corresponding data segments in the pre-saved load data respectively, and combining the A data segments having minimum $\overline{\Delta\theta}$ into one new combined load data;
   regarding the new combined load data as the processed load data and indicating the signal quality is the segment data in the second state.

14. The method according to claim 7, further comprising:
   determining a clock frequency deviation between the transmitting device that transmits the audio data and the receiving device that receives the audio data according to synchronization information obtained at the time of demodulation;
   adjusting a playing clock according to the clock frequency deviation.

15. A device for audio data communication, comprising:
   a data and protocol processor configured to encode audio data at a fixed interval to obtain a plurality of frames of encoded audio data;
   a radio frequency transceiver configured to broadcast M frames of the audio data on a broadcast anchor time slot in a first time slot at a predetermined broadcast interval; and
   a speaker configured to play the audio data after delaying a predetermined time from an anchor of a first broadcast anchor slot,
   wherein the predetermined time is configured for synchronous playback of the audio data at one or more opposite ends, the predetermined broadcast interval is M times of the fixed interval, M is a positive integer, the predetermined time is X times of the broadcast interval, and the X is a positive integer.

16. The device according to claim 15, wherein one broadcast interval comprises one first time slot comprising one broadcast anchor time slot and N broadcast retransmission time slots in series, and
   wherein the broadcast anchor time slot is configured for transmit M frames of the encoded audio data, each of the broadcast retransmission time slots is configured to retransmit the M frames of the encoded audio data, and N is a non-negative integer.

17. The device according to claim 15, wherein the radio frequency transceiver is further configured to:
broadcast a synchronization sequence with a period of Y times of the broadcast interval, and
wherein the synchronization sequence comprises a broadcast interval length being configured to indicate an interval length between two consecutive broadcast anchors and an application mode being configured to indicate a current transmission mode, and
wherein the application mode has corresponding relationship with the broadcast interval and a volume, the audio data is played with delay of the predetermined time and the volume corresponding to the application mode, and the Y is a positive integer.

18. The device according to claim 17, wherein the synchronization sequence further comprises:
the number of broadcast retransmission being configured to indicate the number of broadcast retransmission slots in the first time slot;
a Bluetooth clock being configured to indicate a Bluetooth clock of a transmitting device;
a device address indicating an address of the transmitting device;
an adaptive frequency hopping channel mapping for negotiating useful channels; and/or,
an encoding type for indicating an encoding format and an encoding rate for indicating an encoding rate; and
wherein the application mode has corresponding relationship with the number of broadcast retransmissions, the encoding type and the encoding rate.

19. The device according to claim 18, wherein when the synchronization sequence is transmitted on L channels, an interval between two adjacent synchronization sequences on two adjacent channels is one Lth of an interval between two adjacent synchronization sequences on the same channel, wherein L is a positive integer.

20. The device according to claim 16, wherein the broadcast interval further comprises a second time slot configured for receiving data from a audio source device and transmitting data, and the second time slot comprises a receiving time slot and a transmitting time slot,
the radio frequency transceiver is further configured to receive and demodulate audio data from the audio source device in the second time slot;
the data and protocol processor is further configured to decode the demodulated audio data and then encode the decoded audio data at the fixed interval.

21. A device for audio data communication, comprising:
a radio frequency receiver configured for receiving and demodulating audio data on a broadcast anchor slot in a first time slot at a predetermined broadcast interval;
a data and protocol processor configured for decoding the audio data; and
a speaker configured for playing the decoded audio data starting from the audio data received on a first broadcast anchor slot after delaying a predetermined time from an anchor of the first broadcast anchor slot,
wherein the predetermined time is X times of the broadcast interval, X is a positive integer, and the predetermined time is a delayed play time of the audio data at one or more opposite ends.

22. The device according to claim 21, wherein the radio frequency receiver is further configured to:
search and parse a synchronization sequence to obtain following information:
a broadcast interval length for indicating an interval length between two consecutive broadcast anchors; and
an application mode for indicating a current transmission mode;
wherein the application mode has corresponding relationship with the broadcast interval and a volume, and the audio data is played with delay of the predetermined time and the volume corresponding to the application mode.

23. The device according to claim 22, wherein the radio frequency receiver searches and parses the synchronization sequence to further obtain following information:
the number of broadcast retransmission being configured to indicate the number of broadcast retransmission slots in the first time slot;
a Bluetooth clock being configured to indicate a Bluetooth clock of a transmitting device;
a device address indicating an address of the transmitting device;
an adaptive frequency hopping channel mapping for negotiating useful channels; and/or,
an encoding type for indicating an encoding format and an encoding rate for indicating an encoding rate; and
wherein the application mode has corresponding relationship with the number of broadcast retransmissions, the encoding type and the encoding rate.

24. The device according to claim 23, further comprising:
a baseband processor configured to perform a cyclic redundancy check CRC on the demodulated audio data, and inform the radio frequency receiver to finish the receiving of the audio data in the broadcast interval if a CRC result of the audio data is correct;
a signal quality estimator configured to obtain a signal angle difference before and after judgment of each of a plurality of data segments in each load data from the radio frequency receiver; and determine the signal quality of each of the plurality of data segments in the load data according to the signal angle difference before and after judgment of each of the plurality of data segments in each load data during demodulation;
the data and protocol processor is further configured to:
obtain a CRC result of the audio data and corresponding load data from the baseband processor,
save a load data of the audio data and the signal quality of each of the plurality of data segments in the load data, increase the number of transmissions of the audio data and determine whether the number of transmissions is equal to a transmission threshold if the CRC result of the audio data is incorrect,
continue to receive the audio data in the broadcast interval if the number of transmissions is not equal to the transmission threshold,
process the load data based on the signal quality of each of the plurality of data segments in one or more pre-saved load data with incorrect CRC results if the number of transmissions is equal to the transmission threshold;
wherein the signal quality is determined based on a signal angle difference before and after judgment for each of the plurality of data segments in each load data during demodulation.

25. The device according to claim 24, wherein the signal quality estimator comprises:
a splitting unit configured for dividing the load data into A data segments each comprising B symbols based on a length of the load data, wherein A is a natural number greater than or equal to 1 and B is a natural number greater than 1;

a first calculating unit configured for calculating a complex signal angle θ before judgment and a data angle ∅ after judgment during demodulation for each symbol separately;

a second calculating unit configured for calculating an absolute value Δθ=|θ−∅| of a difference between the complex signal angle θ and the data angle ∅ for each symbol;

a third calculating unit configured for calculating $\overline{\Delta\theta}$ of each of the A data segments separately, wherein $\overline{\Delta\theta}$ is an average value of B Δθ corresponding to the B symbols in each data segment;

a first determining unit, configured for determining that the signal quality of the data segment is a first state if the signal quality $\overline{\Delta\theta}$ of the data segment is less than or equal to a preset threshold, otherwise, determining that the signal quality of the data segment is a second state.

26. The device according to claim 25, wherein when there is one pre-saved load data, the data and protocol processor is configured for:

regarding the one pre-saved load data with the incorrect CRC result as the processed load data and indicating the signal quality is the segment data in the second state.

27. The device according to claim 25, wherein when there is a plurality of pre-saved load data, the data and protocol processor is configured for:

selecting A data segments having minimum $\overline{\Delta\theta}$ from corresponding data segments in the pre-saved load data respectively, and combining the A data segments having minimum $\overline{\Delta\theta}$ into one new combined load data; and regarding the new combined load data as the processed load data and indicating the signal quality is the segment data in the second state.

28. The device according to claim 23, wherein the data and protocol processor is further configured for:

determining a clock frequency deviation between the transmitting device that transmits the audio data and the receiving device that receives the audio data according to synchronization information obtained at the time of demodulation;

adjusting a playing clock according to the clock frequency deviation.

29. A system for audio data communication, comprising:
a transceiver comprising:
  a data and protocol processor configured to encode audio data at a fixed interval to obtain a plurality of frames of encoded audio data;
  a radio frequency transceiver configured to broadcast M frames of the audio data on a broadcast anchor time slot in a first time slot at a predetermined broadcast interval; and
  a speaker configured to play the audio data after delaying a predetermined time from an anchor of a first broadcast anchor slot; and
one or more receiving devices comprising:
  a radio frequency receiver configured for receiving and demodulating audio data on a broadcast anchor slot of a first time slot at a predetermined broadcast interval;
  a data and protocol processor configured for decoding the audio data; and
  a speaker configured for playing the decoded audio data starting from the audio data received on a first broadcast anchor slot after delaying a predetermined time from an anchor of the first broadcast anchor slot,
wherein the predetermined time is configured for synchronous playback of the audio data at one or more opposite ends, the predetermined broadcast interval is M times of the fixed interval, M is a positive integer, the predetermined time is X times of the broadcast interval, X is a positive integer, and the predetermined time is a delayed play time of the audio data at one or more opposite ends.

* * * * *